United States Patent [19]
Burger et al.

[11] Patent Number: 6,006,325
[45] Date of Patent: *Dec. 21, 1999

[54] METHOD AND APPARATUS FOR INSTRUCTION AND DATA SERIALIZATION IN A COMPUTER PROCESSOR

[75] Inventors: Stephen Burger, Santa Clara; Gary N. Hammond, Campbell; William R. Bryg, Saratoga, all of Calif.

[73] Assignee: Institute for the Development of Emerging Architectures, L.L.C., Cupertino, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/769,784

[22] Filed: Dec. 19, 1996

[51] Int. Cl.$^6$ ............................................ G06F 9/38
[52] U.S. Cl. ................................ 712/214; 712/216
[58] Field of Search .................... 712/205, 214, 712/216, 217, 218, 220, 226, 227, 233, 23, 41

[56] References Cited

U.S. PATENT DOCUMENTS

| | | | |
|---|---|---|---|
| 4,777,594 | 10/1988 | Jones et al. | 395/587 |
| 5,555,432 | 9/1996 | Hinton et al. | 712/23 |
| 5,691,920 | 11/1997 | Levine et al. | 364/551.01 |
| 5,694,565 | 12/1997 | Kahle et al. | 395/392 |
| 5,729,728 | 3/1998 | Colwell et al. | 395/581 |

OTHER PUBLICATIONS

"Power PC 601 User's Manual", 1993, p. 3.53–3.56, G.4–6.
"Power PC Microprocessor Family: The Programming Environments For 32–Bit Microprocessors", Motorola, Inc. Rev. 1, pp. 4–8, 4–9, 6–6, 6–7, 8–99, 8–211, Jan. 1997.
*PowerPC 601 RISC Microprocessor User's Manual*, 1993, p. 10–212.

Primary Examiner—Viet D. Vu
Attorney, Agent, or Firm—Blakely Sokoloff Taylor & Zafman, LLP

[57] ABSTRACT

A new instruction that ensures that the effects of a control register write will be observed at a well defined time is introduced. Specifically, the present invention introduces the concept of a serialization fence instruction. The serialization fence instruction ensures that after a control register in a computer has been modified, all subsequent instructions will observe the effects of the control register modification. Two different serialization fence instructions are illustrated: a data memory reference serialization fence instruction (SRLZ.d) and an instruction fetch serialization fence instruction (SRLZ.i). The data memory reference serialization fence instruction ensures that subsequent instruction executions and data memory references will observe the effects of the control register write. The instruction fetch serialization fence instruction ensures that the entire machine pipeline, starting at the initial instruction fetch stage, will observe the effects of the control register write.

17 Claims, 5 Drawing Sheets

| OPCODE | OPERAND | |
|---|---|---|
| WRite | #NewStatus, PMCR | ; CHANGE PERFORMANCE MONITOR CONTROL REGISTER |
| . . . | | ; ADDITIONAL INSTRUCTIONS |
| SRLZ.d | | ; ENSURE THE CHANGE WILL BE OBSERVED |
| Read | offset(R1), R3 | ; ACCESS MEMORY WITH CHANGED PERFORMANCE MONITOR ; REGISTER IN EFFECT |

FIG. 3

| OPCODE | OPERAND | |
|---|---|---|
| WRite | #VM_On, CRO | ; TURN ON VIRTUAL MEMORY |
| . . . | | ; ADDITIONAL INSTRUCTIONS |
| SRLZ.i | | ; ENSURE EFFECT OF VIRTUAL MEMORY TRANSLATION WILL OCCUR |
| Read | offset(R1), R3 | ; ACCESS MEMORY USING VIRTUAL MEMORY TRANSLATION |

FIG. 4

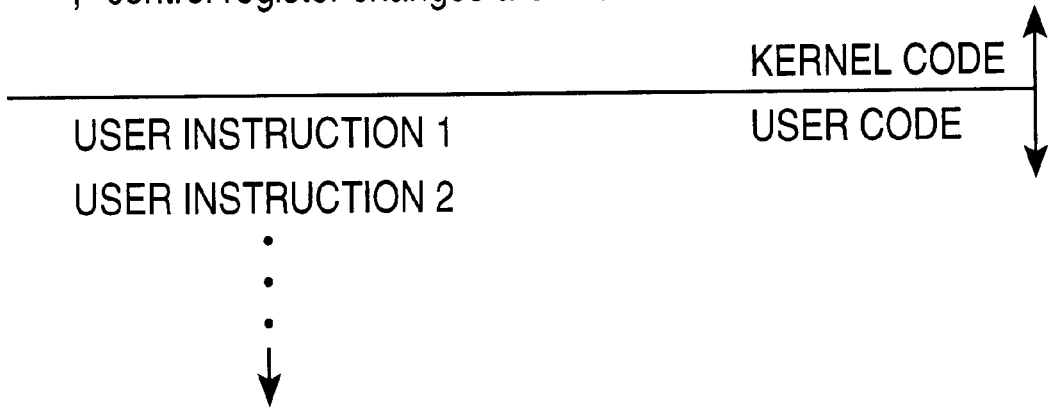

```
OPCODE    OPERAND
;
<Task Save Code here>
; End Task Save Code
;
; Begin Task Reload Code
MOVE   #RegStorage,R1      ;Load pointer to stored registers
MOVE   x00(R1),   PSR      ;Reload registers
MOVE   x08(R1),   DSR
MOVE   x10(R1),   CR0
MOVE   x18(R1),   CR1
MOVE   x20(R1),   CR2
MOVE   x28(R1),   CR3
              •
              •
              •
; End Task Reload Code
SRLZ.i  ; Serialization instruction to ensure all
; control register changes are in effect
                                                  KERNEL CODE ↑
─────────────────────────────────────────────────────────────
USER INSTRUCTION 1                                USER CODE  ↓
USER INSTRUCTION 2
        •
        •
        •
        ↓
```

FIG. 5

METHOD AND APPARATUS FOR INSTRUCTION AND DATA SERIALIZATION IN A COMPUTER PROCESSOR

FIELD OF THE INVENTION

The present invention relates to the field of computer architecture. In particular, the present invention discloses a method for serializing the effects of changes to control registers within a computer processor.

BACKGROUND OF THE INVENTION

Most computer processors have one or more control registers that determine how the computer processor operates. The control register settings may affect things such as instruction fetching, data memory references, and instruction execution behavior. Examples of control register settings include the enabling or disabling of virtual memory translation for instruction fetches, specifying the Little endian or Big Endian nature of data memory references, and the enabling or disabling of processor operating modes such as a supervisor mode for operating systems and a user mode for user programs.

In order for a computer processor to generate predictable results, the processor must respond to changes in control registers in a consistent and well documented manner. Specifically, the effects produced by a control register modification must be observable at a well defined time. In this manner, programmers can rely upon the processor to generate the same results for the same instruction stream.

However, ensuring that the effects of a control register are always observed at a well defined time can be difficult task. Most processors progress through several successive processor generations. Each processor generation will be implemented differently and thus will have a different latency time. Two different methods have been devised to solve this problem: self-serializing processors and defined maximum latency times.

Self-serializing processors ensure that effects of a write to a control register are observable before processing the next instruction. Thus, this method assumes the worst case scenario that after an instruction that modifies a control register, the next instruction is dependent upon the modified control register. In self-serializing processors, the processor either stalls the machine pipeline until the write to the control register takes effect or flushes the machine pipeline to force the next instruction to be refetched after the control register has been modified. For example, early versions of the Intel® Pentium® processor flush the processor pipeline and refetch the instructions any time there is a write to a control register. If there are many successive modifications to control registers, this method can be very inefficient since each control register modification will stall or flush the machine pipeline.

The other known method of ensuring consistent results after a control register modification is to define a maximum latency time for each control register. Specifically, every implementation of the processor must exhibit the observable effects of the control register modification within the defined maximum latency time. Software written for processors with defined maximum latency times must not issue operations that depend upon a modified control register until the maximum latency time has expired. The responsibility for ensuring that such restrictions are followed is usually is given to the compilers for the processors. This technique requires that all the software be written to wait until the maximum latency has passed before scheduling dependent instructions even if the processor may be ready before maximum latency time. Thus, the software is written to fulfill a worst case latency time scenario even though the processor may be ready before maximum latency time has expired.

The two current methods of ensuring that the effects of a control register write are always observed at a well defined time each have disadvantages. In the case of a self-serializing processor, each instruction that modifies a control register will cause a pipeline stall or a pipeline flush with a subsequent refetch. In the case of a processor with defined maximum latency times, the software must be written not to violate a predefined maximum latency time even if that particular processor implementation would be ready earlier. It would therefore be desirable to implement an improved method of ensuring that the effects of a control register write are observed at a well defined time.

SUMMARY OF THE INVENTION

The present invention introduces a new instruction to ensure that the effects of a control register write will be observed at a well defined time. Specifically, the present invention introduces the concept of a serialization fence instruction. The serialization fence instruction ensures that after a control register in a computer has been modified, all subsequent instructions will observe the effects of the control register modification. Two different serialization fence instructions are illustrated: a data memory reference serialization fence instruction (SRLZ.d) and an instruction fetch serialization fence instruction (SRLZ.i). The data memory reference serialization fence instruction ensures that subsequent instruction executions and data memory references will observe the effects of the control register write. The instruction fetch serialization fence instruction ensures that the entire machine pipeline, starting at the initial instruction fetch stage, will observe the effects of the control register write.

Other objects, features and advantages of present invention will be apparent from the accompanying drawings and from the following detailed description.

BRIEF DESCRIPTION OF THE DRAWINGS

The objects, features and advantages of the present invention will be apparent to one skilled in the art, in view of the following detailed description in which:

FIG. 3 lists example code that serializes data dependent instructions.

FIG. 4 lists example code that serializes instruction fetch dependent code.

FIG. 5 lists example code for implementing a context switch within a multitasking operating system.

DETAILED DESCRIPTION OF THE INVENTION

A method and apparatus for a computer process with a control register serialization instruction is disclosed. In the following description, for purposes of explanation, specific nomenclature is set forth to provide a thorough understanding of the present invention. However, it will be apparent to one skilled in the art that these specific details are not required in order to practice the present invention.

Control Registers in the Processor of a Computer System

Figure 1:
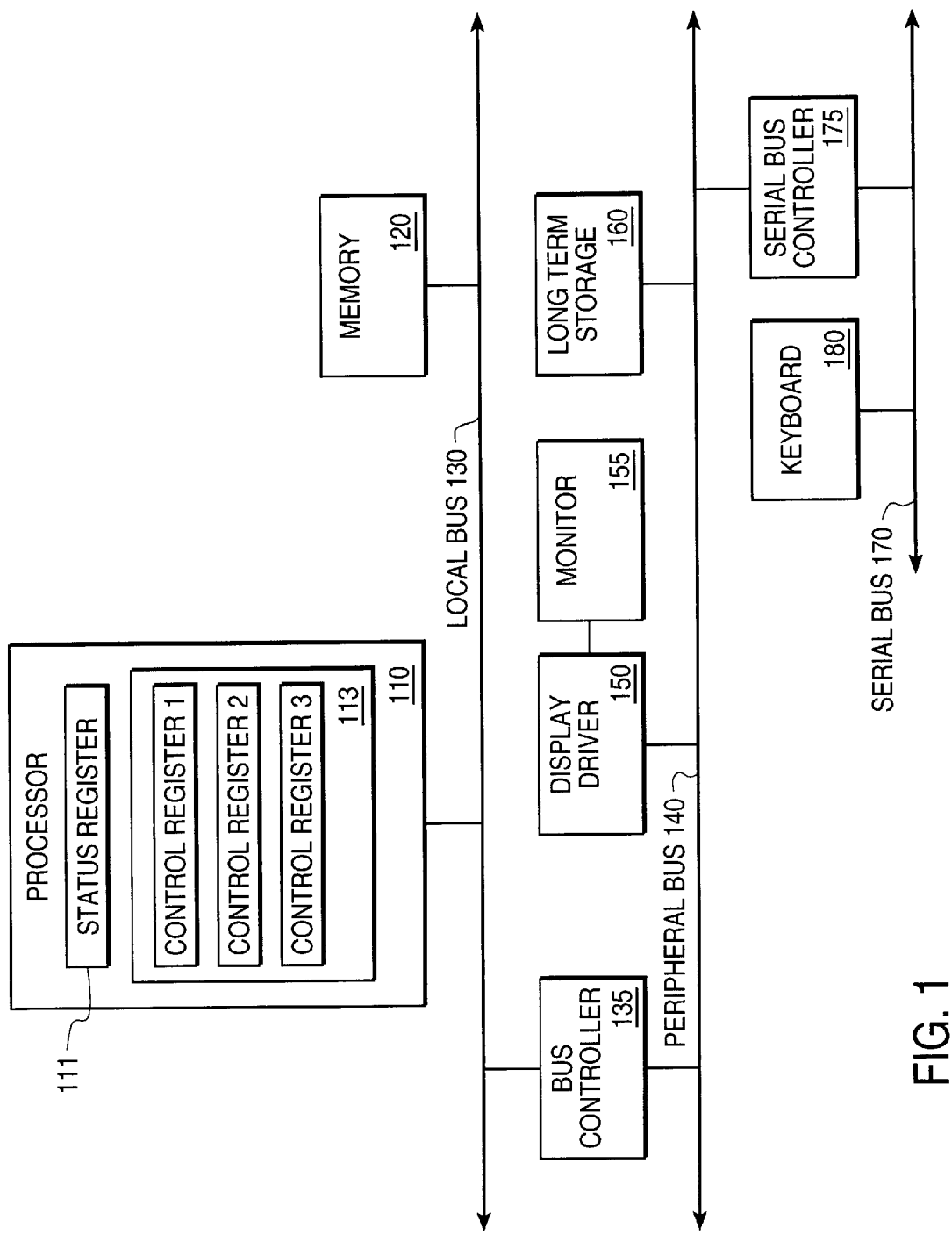
FIG. 1 illustrates a processor with a set of status and control registers.

FIG. 1 illustrates a block diagram of a typical computer system. In the computer system of FIG. 1 there is a processor 110 coupled to memory 120 through a local bus 130. The local bus 130 is coupled to a bus controller 135, which controls a peripheral bus 140. The peripheral bus 140 is coupled to an input/output device such as a display driver 150 for driving a video display, a long term storage device 160 such as a hard disk, and a serial bus controller 175. The serial bus controller 175 controls a slower serial bus for controlling slow input/output devices such as keyboard 180.

The processor 110 in the computer system in FIG. 1 has a set of control registers 113 and a status register 111. The control registers 113 control how the processor 110 operates. The control registers 113 affect the processor's operations such as how the processor fetches instructions, how the data memory is organized and addressed, and how instructions are executed. For example, a control register may indicate whether or not virtual memory translation is enabled.

The status register 111 defines a current status of the processor. The status register 111 usually comprises a set of bits that define the current state of the processor such as whether there has been an overflow or whether an interrupt has occurred. A status register can be saved into memory and later retrieved in order to save and restore a processor state for implementing multitasking operating systems.

Writes to Control Registers within a Processor

Most existing microprocessors execute instructions in a series of small individual steps. The steps of executing an instruction are broken down into several different logic units. The different logic units are linked together in a series referred to as the microprocessor machine pipeline.

Figure 2A:
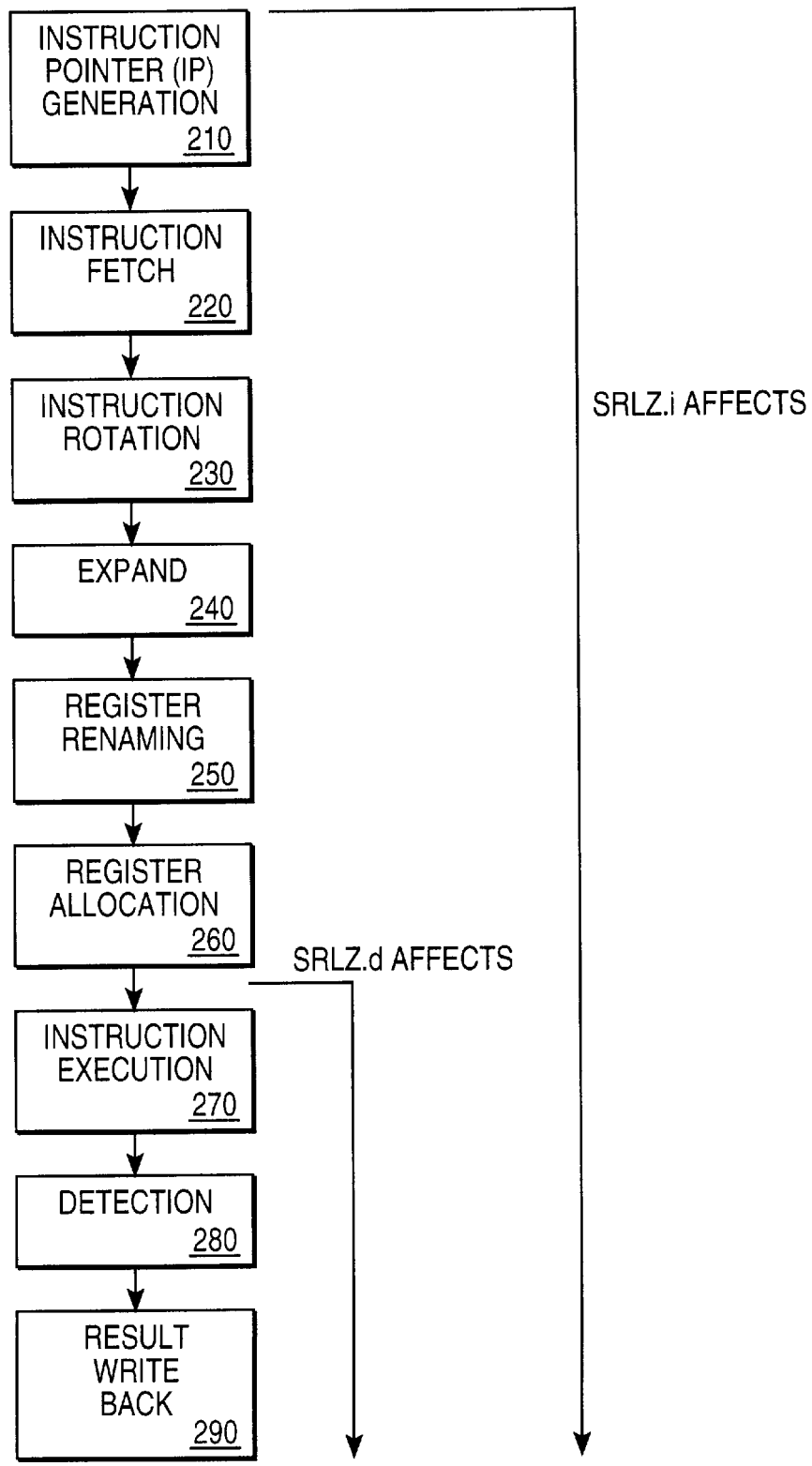
FIG. 2a illustrates a deep machine pipeline that illustrates the use of the fence instruction of the present invention.

FIG. 2a illustrates a block diagram of one possible microprocessor pipeline. The microprocessor pipeline of FIG. 2a processes instructions in nine different pipeline stages. The microprocessor pipeline of FIG. 2a first generates an instruction pointer at pipeline stage 210. Instruction pointer generation is assisted by the use of a branch prediction unit. Next at pipeline stage 220, the instruction is fetched from a cache memory or main memory. At pipeline stage 230 instruction rotation is performed to align the instruction. Next, at pipeline stage 240, the instruction is expanded. At pipeline stage 250 register renaming is performed. After register renaming register, allocation is performed at pipeline stage 260. At pipeline stage 270 the instruction is executed by an execution unit to determine a final result. At pipeline stage 280 detection is performed to see if any exceptions were generated by the instruction execution. Finally, at pipeline stage 290 the results of the executed instruction are written back.

When an instruction that writes to a control register is executed at execution stage 270 there is a latency period before the effects of that write to the control register will be observed. For example, in FIG. 2a the write instruction may be executed at the stage 270, but it is not until the write instruction reaches writeback stage 290 that the results of a write to control register can be observed. When a successive instruction in the preceding pipeline stage immediately follows a control register write instruction, that successive instruction will not observe the effects of the instruction that wrote to the control register.

For example, referring to FIG. 2a, if there is a control register write instruction in stage 270 and a dependent instruction in register allocation stage 260, then after the control register write instruction moves to the detection stage 280, the dependent instruction will move to the execution stage 270 and will be executed before the effects of the write to the control register can be observed. In this case, the microprocessor will not operate as expected since the latency of the control register write prevents the effects of the control register write from being observed by the following instruction.

To solve this problem, previous processor architectures used two different methods: instruction self-serialization and maximum latency times. Any processor that implements self-serialization effectively halts all processing operations until the effects of the control register write can be observed. For example, in the case where there is a write to control register in the execution stage and there is a dependent instruction in the register allocation stage 260, then all the early pipeline stages from the register allocation and back are stalled until the control register write has passed the write result stage 290. Only then will the dependent instruction be allowed to proceed to the execution stage 270. Other methods of implementing self-serialization are to flush the pipeline and force the instructions to be refetched.

In processors that have defined maximum latency times the software must be written such that an instruction that depends on an earlier control register write must not be scheduled until a maximum defined latency time for that control register write has expired. Using the earlier example with reference to FIG. 2a, a maximum latency time may be defined as two clock cycles. Thus, if an instruction that writes to a control register is in execution unit 270 then the software will not be allowed to have an instruction that depends on the control register write that is within two clock cycles of the write instruction. Thus, a dependent instruction can only appear as early as the expand stage 240. (The two clock cycle latency period is used as an example, other pipelines will use other latency periods.) If software scheduled on instruction in accordance with the defined latency period, then the software cannot be assured of operating properly.

The Serialization Fence Instruction

To ensure that the effects of writes to control registers are visible before dependent instructions are executed, the present invention introduces a new serialization "fence" instruction. A serialization fence instruction is an instruction that forces the processor to perform whatever actions are necessary such that the results of a write to control register will be observable to any instruction located after the serialization fence instruction.

The serialization fence instruction of the present invention has fencing semantics. Specifically, the serialization fence instruction ensures that all control register updates are completed such that effects become observable before the next instruction is operated on. To best use a serialization fence instruction, the software should delay issuing dependent instructions as long as possible and then issue the serialization fence instruction immediately before the dependent instruction. By delaying the issuance of the dependent instructions, the serialization fence instruction may simply act as a fast No-op (No operation) since the effects may be observable by the time the serialization fence instruction is issued.

In a present embodiment, two different versions of the serialization fence instruction are implemented: a data memory reference or execution serialization fence instruction (SRLZ.d) and an instruction fetch or decode serialization fence instruction (SRLZ.i). Each different serialization fence instruction will be described in detail.

Data Memory Reference Serialization Fence Instruction

The first serialization fence instruction is the data memory reference or execution serialization fence instruction: SRLZ.d. The data memory serialization fence instruction SRLZ.d ensures that all prior control register writes that affect the instruction execution aspects of the processor are visible before the following instruction is allowed to execute.

FIG. 3 illustrates an example use of the data memory reference serialization fence instruction. In FIG. 3, a write instruction writes a new status value to a performance monitor control register (PMCR). This change of the write instruction writes a new status value to a PCMR and will affect any subsequent data memory reference operations such as reads from memory or writes to memory. Therefore, before any data memory reference instruction the SRLZ.d serialization fence instruction should be executed. Note, however, that any number of instructions that are not affected by the write to the performance monitor control register may exist between the write to the performance monitor control register and the SRLZ.d serialization fence instruction. The SRLZ.d serialization fence instruction will ensure that the write to the performance monitor control register will be observed before the following instruction. As illustrated in the FIG. 3, the subsequent memory read instruction will observe the effects of the write to the performance monitor control register.

The data memory reference serialization fence instruction can be implemented several different ways. A very simple method of implementing the instruction would be to flush the processors pipeline and force a re-fetch of subsequent instructions. However, this method is extremely inefficient since the entire contents of the machine pipeline is wasted and must be re-fetched.

An improved method of implementing this instruction would be to stall the instruction issue phase of the machine pipeline until the worst case control register latency period expires. For example, using the pipeline of FIG. 2a, the register allocation stage 260 and all the previous stages could be stalled for a predetermined worst case latency period when a write to a control register is detected by the execution stage 270. Only after the worst case latency period has expired would subsequent instructions be allowed to proceed to the execution stage 270. After the worst case latency period has expired, the write to a control register will have been resolved by the result write-back stage 290.

Figure 2B:
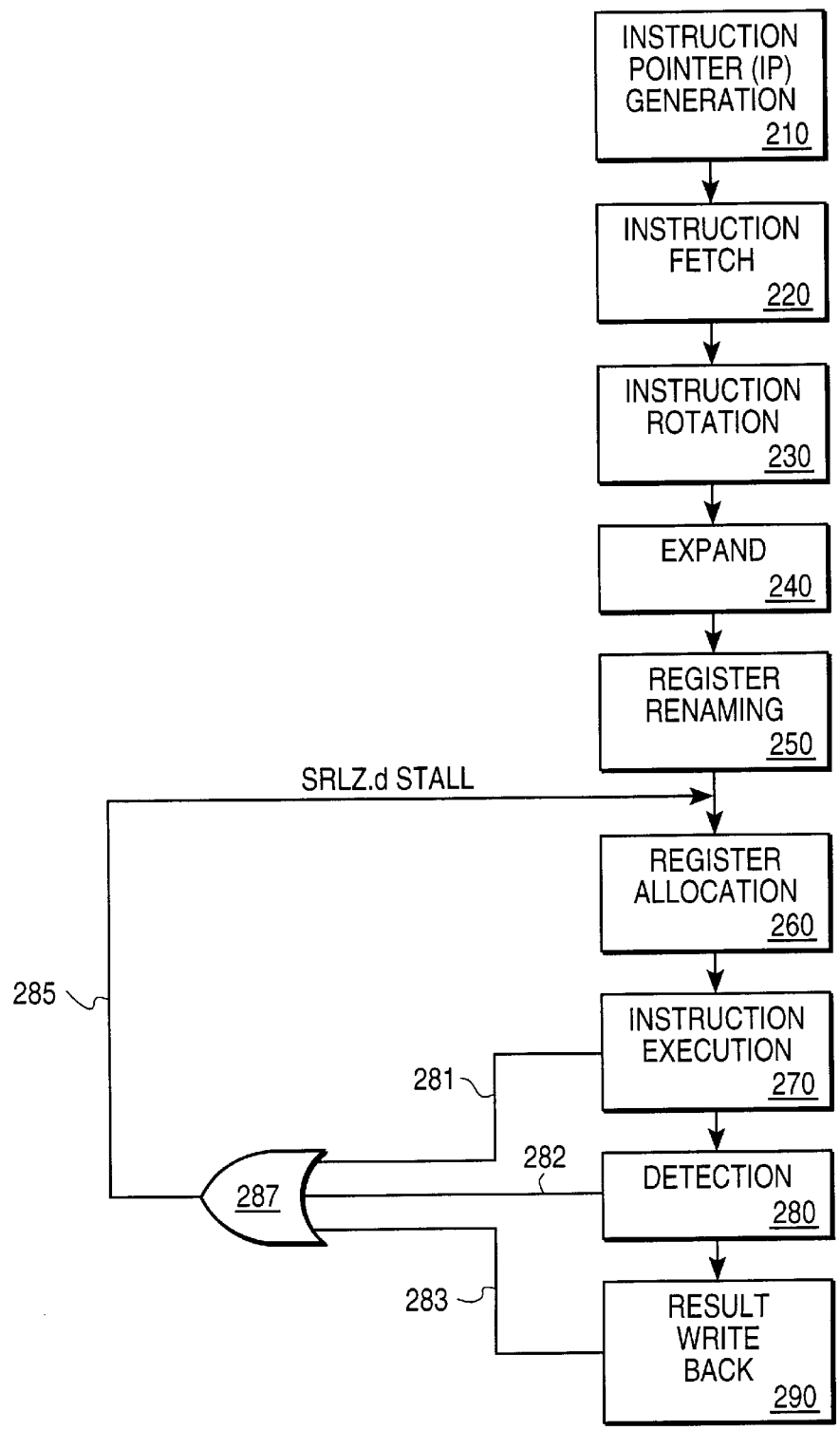
FIG. 2b illustrates the deep machine pipeline of FIG. 2a with one embodiment of the serialization fence instruction.

However, the best method of implementing the data memory reference serialization fence instruction would be to stall the instruction issue phase if and only if any control register write latency period has not yet expired. Note that if the control register latency period has expired then the serialization fence instruction performs no operation (No-op). One possible embodiment of this implementation method is illustrated by FIG. 2b. Referring to FIG. 2b, the execution stage 270, the detection stage 280, and the result write-back stage 290 all have "Control Register Write In Progress" lines 281, 282, and 283. The Control Register Write In Progress lines 281, 282, and 283 indicate that the pipeline stage is still processing a control register write. The Control Register Write In Progress lines 281, 282, and 283 are all logically ORed together with OR gate 287 and passed to the register allocation stage 260 as an SRLZ.d stall line 285. An asserted SRLZ.d stall line 285 instructs the register allocation stage 260 not to pass additional instructions to the instruction execution stage 270 until the stall signal is removed. The embodiment illustrated in FIG. 2b is just one example of how the SRLZ.d fence instruction may be implemented.

Instruction Fetch Serialization Fence Instruction

Most writes to a control register will only effect the execution and later stages of the machine pipeline. However, some writes to control registers can effect the entire machine pipeline. Specifically, writes to control registers that effect how instruction fetching is performed will effect the processor starting at the very beginning of the machine pipeline where instructions are fetched. An example of a control register write that would effect the entire pipeline would be a control register write that enables virtual memory translation. After virtual memory translation has been turned on the addresses generated by subsequent instructions (such as branch target addresses from branch instructions) should be interpreted differently such that different memory addresses would actually be accessed. Thus, referring to FIG. 2a, in certain situations the entire machine pipeline should be effected by a serialization fence instruction.

FIG. 4 illustrates an example of an instruction fetch serialization fence instruction in use. The first instruction is a write to a control register that turns on virtual memory (write VM_On into Control Register 1). Next, any number of instructions that do not reference memory may exist. But before any instruction that references the memory, the SRLZ.i serialization fence instruction is issued to ensure the effect of virtual memory translation will be visible for subsequent instructions. After the SRLZ.i serialization fence instruction, all subsequent instructions should be fetched from memory using virtual addresses that are translated into physical addresses. Thus, the serialization fence instruction must perform whatever actions are necessary to ensure that the effects of the virtual memory translation will become visible. The instruction fetch serialization fence instruction (SRLZ.i) is thus a superset of the data memory reference serialization fence instruction since it effects a greater portion of the machine pipeline.

The instruction fetch serialization fence instruction (SRLZ.i) can be implemented in a number of ways. A simple method of implementing the instruction fetch serialization fence instruction would be to always flush the processor's pipeline and force a re-fetch of all subsequent instructions after the effects of the control register write are visible. This would be an inefficient implementation since the write to the control register may not effect some instructions in the pipeline such as instructions that do not access memory.

A better method of implementing the instruction fetch serialization fence instruction would be to flush the processor's pipeline only if the control register write affects the instruction stream fetching. This method is relatively simple to implement with microcode and yields a significant performance increase over the simple mandatory pipeline flush technique.

The most sophisticated of implementing an instruction fetch serialization fence instruction would be to keep track of all control register write latencies using a score boarding circuit. The SRLZ.i instruction would then flush the machine pipeline only if the instructions fetched after the SRLZ.i instruction were fetched incorrectly since the control register effects were not observable yet.

Serialization Fence Instruction Usage

One of the most important uses of the serialization fence instructions is for implementing the task switch phase of a multitasking operating system. During the task switch of a multitasking operating system, the processor must save a current processor state for a currently executing first user program and then reload a different processor state from a second user program that is scheduled to run next. After reloading the processor state of the second user program, the multitasking operating system then begins executing the second user program. During the task switching operation, a number of control registers are saved to save the processor state of the first user program and then the control registers are reloaded using the control register settings from the second user program that is about to be executed. Since several control registers are affected at the same time during a task switch, the present invention allows several control registers to be set and then followed by a single serialization fence instruction such that all instructions following the serialization fence instruction will observe the effects of the control register writes.

FIG. 5 illustrates an example of a portion of task switch code for a multitasking operating system. Referring to FIG. 5, a first section of code (not shown) saves the state of the currently executing program. Then, the next section of code reloads the state of another user program. The first instruction of the reload moves a register storage address into register one. Then, using register one as an index, a series of stored control register and status register values are moved from the register storage area into the proper registers of the processor. Specifically, the first instruction moves a value into a processor status register then the next instruction moves another value into a DSR. The remaining move instructions move values into control registers 0 through N.

After all the control and status register updates are completed, a single serialization fence instruction is issued at the end of the kernel code. After the serialization fence instruction, the user code can then be executed with the knowledge that the writes to the control registers will now be observable since the serialization fence instruction immediately preceded the user code. Thus, a single serialization fence instruction can be used to ensure that the effects of several control register writes will be visible after the serialization fence instruction.

In the foregoing specification the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than restrictive sense.

We claim:

1. In a computer processor, a method of ensuring that the effects of control register writes are visible to succeeding instructions, said method comprising:

executing a first instruction that modifies at least one bit in a control register in said computer processor;

executing a serialization fence instruction, said serialization fence instruction determining if said processor should stall a subsection of a pipeline in said computer processor until a latency period expires to ensure that effects from said modified control register are observable by a next sequential instruction; and executing said next sequential instruction.

2. The method as claimed in claim 1 wherein said latency period comprises a worst case latency period.

3. The method as claimed in claim 1 wherein said latency period associated with said control register.

4. The method as claimed in claim 1 wherein said serialization fence instruction stalls said subsection of said pipeline in said computer processor if a late stage in said pipeline determines said control register effects are not observable yet.

5. The method as claimed in claim 1 wherein said serialization fence instruction ensures that all subsequent data memory references will observe the effects of said modified control register.

6. The method as claimed in claim 3 wherein said defined latency period comprises a worst case latency period.

7. The method as claimed in claim 1 wherein said serialization fence instruction executes in parallel with another instruction when no stall is required.

8. A computer processor, said computer processor having control registers that govern how said computer processor operates, said computer processor comprising:

a machine pipeline, said machine pipeline comprising a series of instruction processing stages; and a pipeline stall circuit, said pipeline stall circuit stalling a subsection of said machine pipeline until a latency period expires if a serialization fence instruction determines that an instruction issued before said serialization fence instruction that affects instruction execution has not completed.

9. The computer processor as disclosed in claim 8 wherein said latency period comprises a worst case latency period.

10. The computer processor as disclosed in claim 8 wherein said pipeline stall circuit stalls said subsection of said machine pipeline if a write to one or more of said control registers is in progress.

11. The computer processor as disclosed in claim 8 wherein said pipeline stall circuit stalls an instruction fetch and decode subsection of said machine pipeline.

12. A computer processor, said computer processor having control registers that govern how said computer processor operates, said computer processor comprising:

a machine pipeline, said machine pipeline comprising a series of instruction processing stages; and a latency scoreboard circuit, said latency scoreboard circuit tracking latency periods for any writes to said control registers; and a pipeline stall circuit, said pipeline stall circuit stalling an early set of said instruction processing stages when a serialization instruction determines that a latency period for a write to a control register has not expired.

13. The method as claimed in claim 1 wherein one of said next sequential instruction comprises a memory reference command.

14. The method as claimed in claim 1 wherein said control register controls memory mapping.

15. The method as claimed in claim 1 wherein said control register controls instruction fetching.

16. The method as claimed in claim 1 wherein said first instruction executes before said fence serialization instruction executes.

17. The method as claimed in claim 1 wherein said next sequential instruction executes after said serialization fence instruction executes.

* * * * *